Aug. 7, 1928.
H. L. PITMAN
1,679,741
TYPEWRITING MACHINE
Original Filed Feb. 27, 1923    3 Sheets-Sheet 3
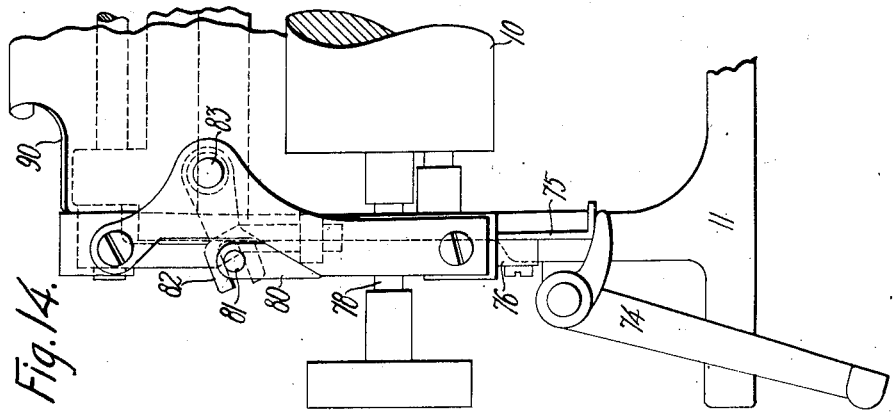
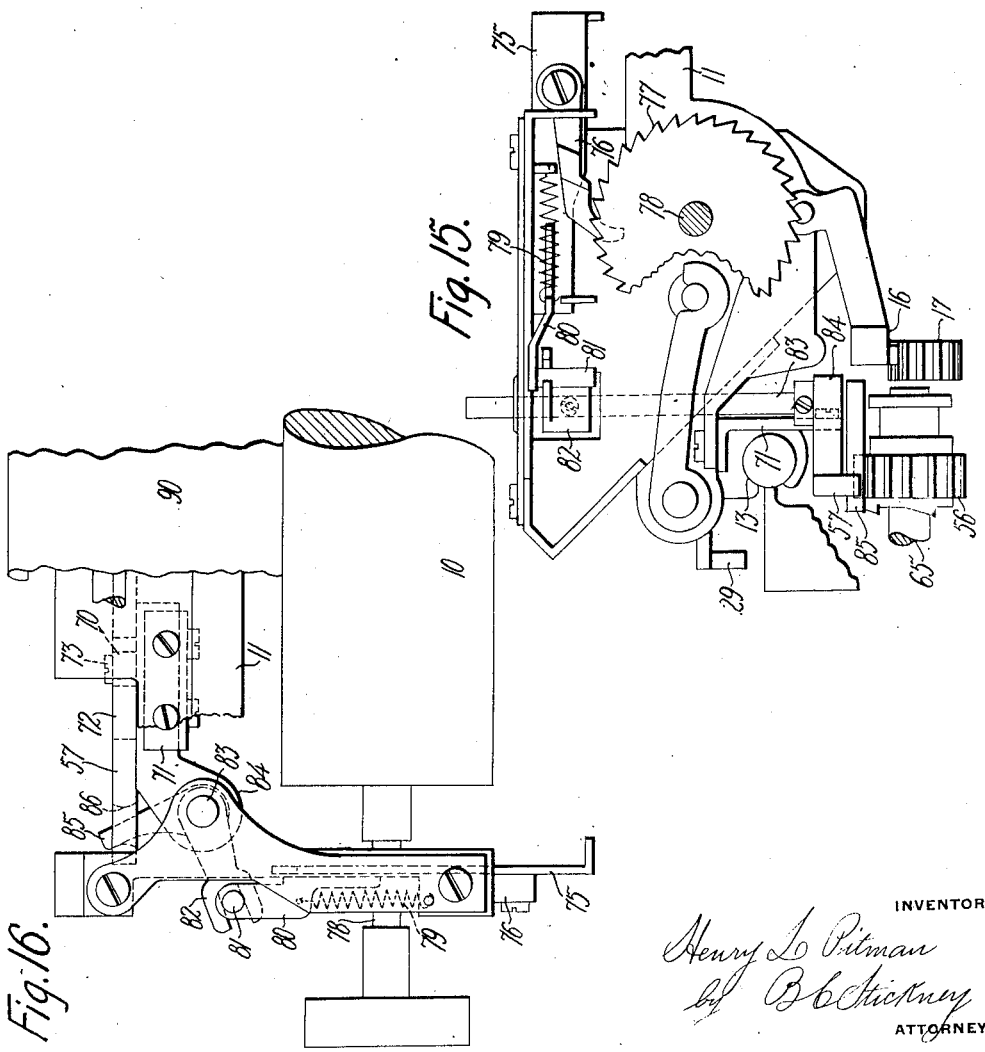
INVENTOR
Henry L. Pitman
by B. C. Stickney
ATTORNEY Patented Aug. 7, 1928.

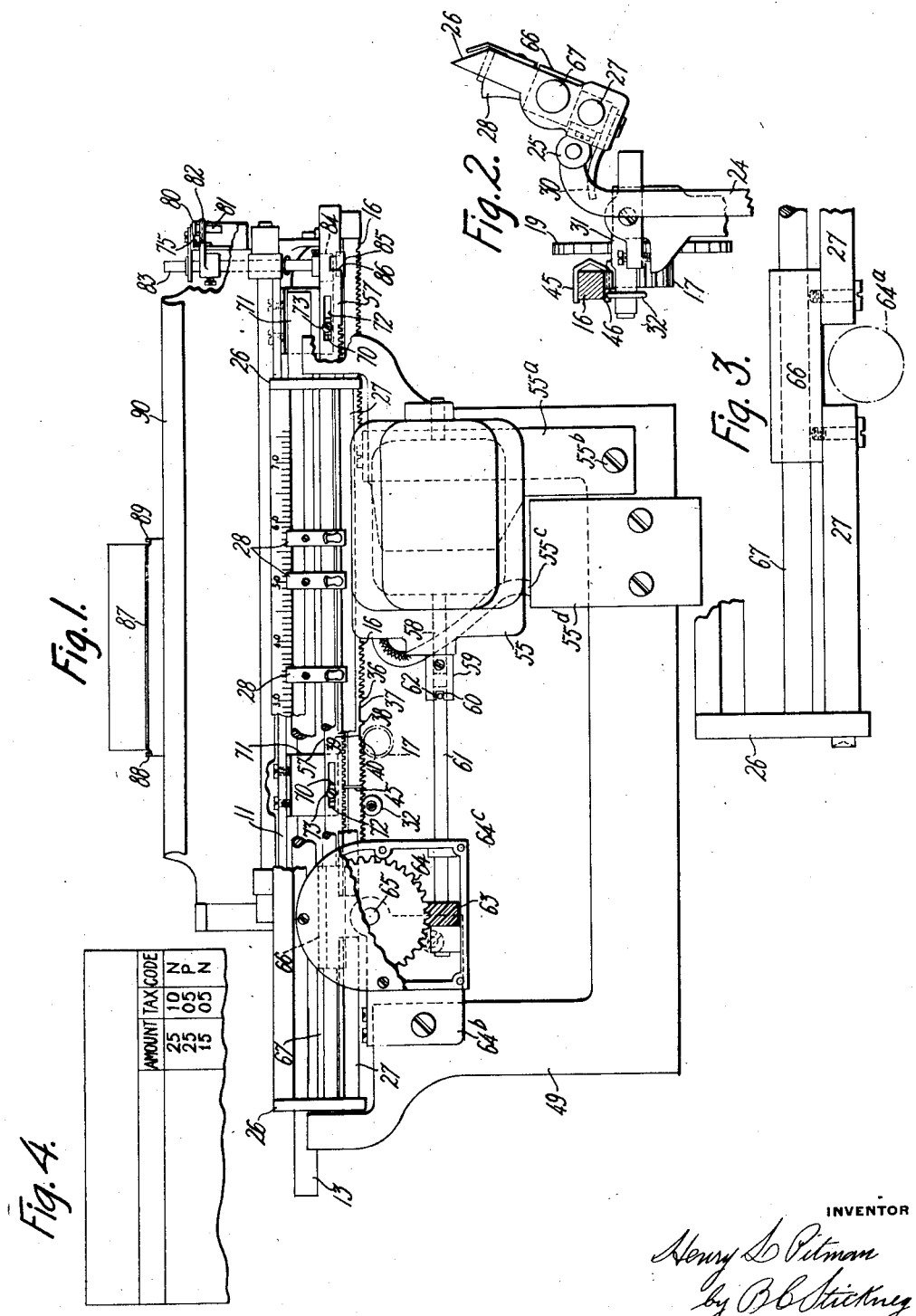

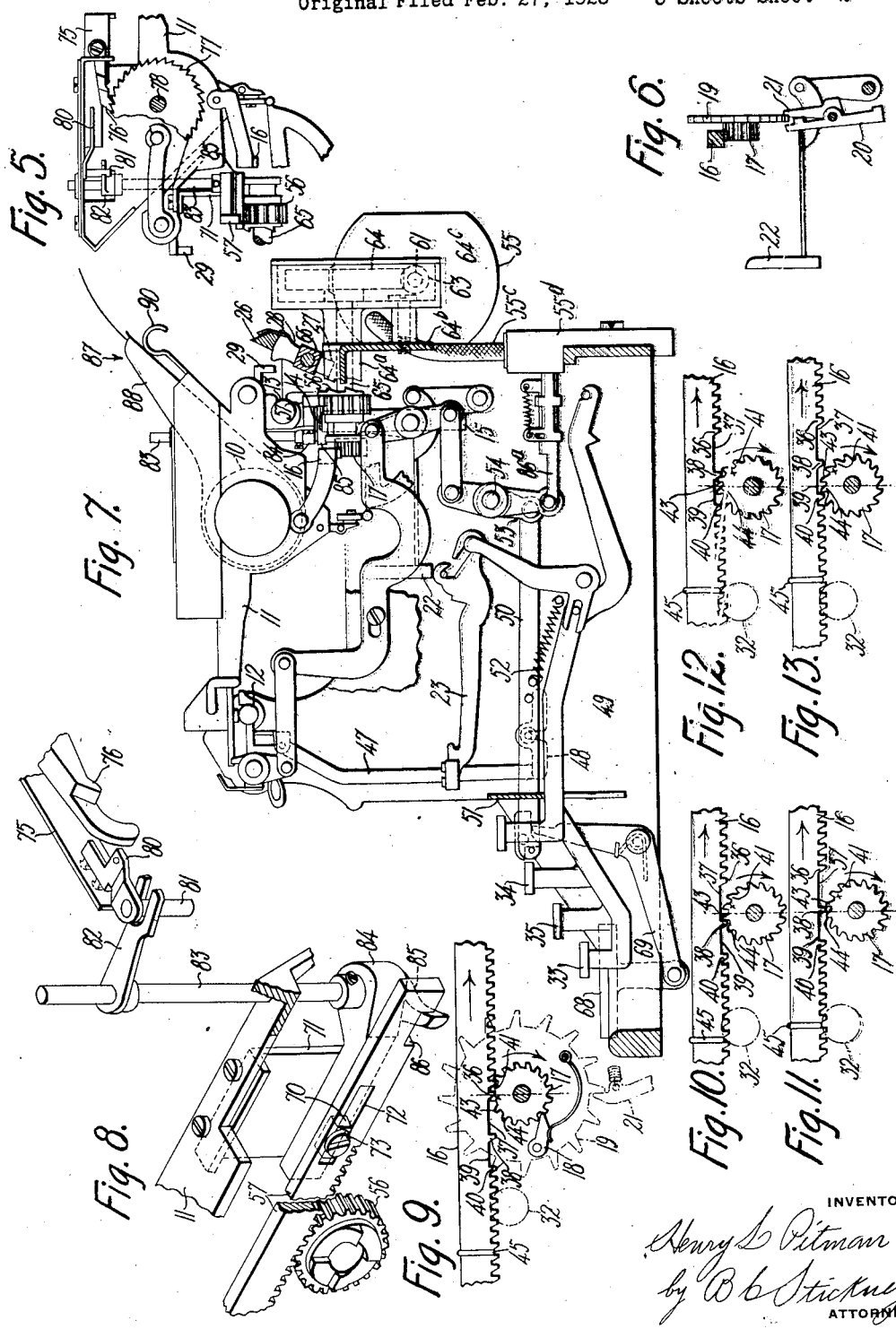

1,679,741

UNITED STATES PATENT OFFICE.

HENRY L. PITMAN, OF WESTFIELD, NEW JERSEY, ASSIGNOR TO UNDERWOOD ELLIOTT FISHER COMPANY, OF NEW YORK, N. Y., A CORPORATION OF DELAWARE.

TYPEWRITING MACHINE.

Original application filed February 27, 1923, Serial No. 621,520. Divided and this application filed February 2, 1926. Serial No. 85,438.

This invention relates to machines for writing bills for telephone service, in which operation it is required to type, in separate columns, the date, the number of messages, the place called, the company's charge, the United States tax and a code symbol. The principal object of the invention is to provide means for expediting writing of these bills, and particularly to expedite the movement of the carriage to the tax and code columns by causing it to jump automatically to each of these columns upon the completion of the entry in the preceding column. The invention is useful for other purposes, however.

The typewriter-carriage is propelled in letter-feeding direction by the usual spring drum, and is controlled by suitable, escapement mechanism comprising a pinion, in mesh with a rack having teeth at letter-space intervals, on the carriage. The carriage is jumped automatically to the tax column without attention from the operator upon the completion of the entry in the preceding column of the bill by omitting from the rack the teeth which would ordinarily connect the carriage with the escapement mechanism to control the letter-feeding movement of the carriage between these columns. The carriage, being unrestrained when this gap is reached, is caused to jump forward and is arrested by engagement of the escapement pinion with the next tooth on the rack, which thus positions the carriage for writing in the tax column.

The amount of the tax item is always either five or ten cents. Two special keys are provided, one for writing "05", and the other for writing "10" in the tax column, so that the tax is always written by a single key-stroke. It is desired to cause the carriage to jump automatically to the code column as an incident of the writing in the tax column. The pinion always has two teeth in positions to be engaged by the rack and is advanced a single tooth-space at each operation, so that each pinion tooth has two rack-engaging positions. Two feeding steps are ordinarily required, therefore, to move a rack-tooth past the escapement pinion. In order to advance the carriage as desired, it is necessary to get the rack tooth which arrests the carriage in the tax column past the pinion at a single writing operation. For this purpose a cam is provided on the rack in position to be engaged and lifted by a rack-lifting roller forming part of the tabulating mechanism, as the carriage is advanced under the influence of the escapement mechanism due to the tax writing operation. This lifts the rack momentarily out of engagement with the escapement pinion, releasing the carriage to the action of the spring drum. When the rack descends, the pinion is opposite a second gap in the rack, so that the carriage continues to advance until arrested by a rack-tooth at the opposite side of this second gap. A single key is then operated to write the code symbol. The carriage, when it reaches a certain position is returned by a motor automatically set into operation, as after the writing of the code symbol.

One feature of the invention relates to the arrangement of the carriage-returning motor and the connections between it and the carriage, with reference to the machine. These parts are mounted upon the rear of the machine-frame and project but slightly to the rear of it. The motor and the carriage-operating connections are made in two separable units, each removably mounted on the back of the machine-frame. Each of these units comprises a shaft, and these shafts are substantially aligned and are loosely connected when operatively positioned, with provision for universal movement. Such provision makes it unnecessary to align the shafts accurately when mounting the units upon the machine.

Another feature of the invention is the modification of the tabulating frame of the machine to give clearance for the passage of the motor-connections. The pivot-shaft of the tabulating frame is divided, and its sections are connected by a member, at one side of them, which surrounds and is braced by the rod on which the tabulating stops are mounted. A shaft, driven by the motor, passes through the opening thus formed in the tabulator-frame shaft.

Another feature of the invention is the provision of improved mechanism for automatically line-spacing the platen, as an incident of its return movement. A carriage-returning rack on the carriage is movable relatively to the carriage for a limited distance, and during this relative movement the rack operates a slotted crank to draw rearward a vertical pin on the line-spacing slide, and through said pin to line-space the platen. The connection between the slotted crank and the vertical pin is loose to permit vertical movement of the pin independently of the crank in case-shifting, and the pin is of such length that the connection between the line-spacing slide and the crank is not affected by such shifting.

This application is a division of my application, Serial No. 621,520, filed February 27, 1923 (now Patent No. 1,580,326, dated April 13, 1926).

Other features and advantages will hereinafter appear.

In the accompanying drawings,

Figure 1 is a rear elevation of the machine with parts broken away for clearness of illustration.

Figure 2 is a fragmentary sectional side elevation, showing parts of the tabulating and escapement mechanisms.

Figure 3 is a fragmentary rear elevation of the tabulator frame, showing how provision is made for the passage of the motor connection.

Figure 4 is a portion of a telephone bill written by the machine.

Figure 5 is a fragmentary side elevation, showing the platen-carriage shifted for upper-case writing.

Figure 6 is a side elevation of the escapement mechanism.

Figure 7 is a vertical longitudinal sectional view of a typewriting machine having the present improvements applied thereto.

Figure 8 is a fragmentary perspective view, showing particularly the automatic line-spacing mechanism.

Figure 9 is a fragmentary rear sectional elevation, showing the escapement mechanism and the rack in the relative positions occupied just prior to writing the units digit in the company's charge column, when a single key-stroke will be effective to cause the carriage to jump to the tax column.

Figure 10 is a view, similar to Figure 9, showing the rack and pinion in the positions occupied when the carriage is in the tax column.

Figure 11 is a view, similar to Figure 9, showing the rack and pinion in the positions occupied just after the tax item has been written, the rack having advanced about one tooth-space from the position of Figure 10, and being lifted out of engagement with the pinion.

Figure 12 is a view, similar to Figure 9, showing the rack returned to lowered position but still not engaged by the pinion due to the second gap in the rack-teeth.

Figure 13 is a view, similar to Figure 9, showing the rack in the position occupied when the carriage is arrested in position for writing in the code column.

Figure 14 is a fragmentary plan view of the left end of the machine, showing the line-spacing mechanism.

Figure 15 is a fragmentary vertical longitudinal sectional view, showing the line-spacing mechanism.

Figure 16 is a fragmentary plan view of the left end of the machine, with parts broken away for clearness of illustration.

A platen 10 is rotatably mounted in a carriage 11, which is supported on a front rail 12 and a rear rail 13, and urged in a letter-feeding direction by means of a strap 14 connected at one end to the carriage 11 and at the other end to a spring drum 15. Movement of the carriage 11 under the urging of the spring drum 15 is controlled by suitable escapement mechanism, comprising a rack 16 connected with the carriage to travel therewith and meshing with a pinion 17 having a one-way connection through a pawl 18 with an escapement wheel 19, which, in turn, is controlled by fast and loose dogs 20 and 21, respectively, operated by a universal bar 22 in the paths of type-bars 23.

Depression of a palm tabulator (not shown) acts through a link 24 and an arm 25 to rock a column stop frame 26 about a shaft 27 to bring a column stop 28 operatively positioned on the frame 26 into the path of a stop 29 mounted on the typewriter-carriage 11. At the same time an arm 30 secured to the shaft 27 will be swung downwardly to actuate a lever 31 about its pivot, to cause a roller 32 at the forward end thereof to lift the rack 16 out of engagement with the pinion 17, thereby releasing the carriage 11, and permitting it to be drawn by the spring drum 15 in letter-feeding direction until the counterstop 29 on the carriage is moved into engagement with the next operatively positioned stop 28. The mechanism just described is, in general, similar to that disclosed in the patent to H. Crutchley, No. 929,080, dated July 27, 1909.

The machine comprises the usual number and alphabet keys 33 and, in addition, a special key 34 marked "single tax" for writing "05," and a special key 35 marked "double tax" for writing "10." As has been stated, the bills which the machine is designed to write comprise separate columns for the amount of the company's charge, the United States tax and a code symbol (see Figure 4), and it is desired to cause the carriage to move to each of the latter columns automatically, upon the completion of the writing in the preceding column. To this end, the teeth are omitted from the rack-bar 16 which would ordinarily control the letter-feeding of the carriage between the company's charge column and the tax column, leaving a gap 37 in the rack. When the carriage has reached the position for typing a units digit in the company's charge column, the rack and pinion will be in the relative positions shown in Figure 9, with only the rack-tooth 36 in engagement with the pinion 17, it being engaged and detained by the pinion-tooth 41. The operation of a key 33 to write, advances the escapement-pinion 17 one tooth-space, withdrawing the tooth 41 from the path of rack-tooth 36. The carriage is thus left unrestrained, and, as it passes forward out of the charge column, it continues to advance until the tooth 38 at the opposite side of the gap 37 engages a tooth 43 of the pinion, as seen in Figure 10. The carriage 11 is correctly positioned for writing in the tax column when so arrested.

One of the special tax keys is operated to write the tax item, and its operation causes the pinion 17 to be advanced one tooth-space, that is, moves the tooth 43 from its Figure 10 position to its Figure 11 position. In order to cause the rack-tooth 38 to clear the pinion 17 in this operation, so that the carriage 11 may be jumped automatically to the code column, a staple-like member 45 is arranged to embrace the rack 16, with its lower leg 46 extending forward beyond the teeth of the rack in position to engage the roller 32 and act as a cam to lift the rack 16 momentarily out of engagement with the pinion 17. This cam 46 rides up on the roller 32 as the Figure 11 position is reached, and thereby disengages the teeth 38 and 43 to release the carriage to the action of the spring drum 15. As the carriage 11 moves forward, the rack 16 quickly descends (see Figure 12), but a second gap 39 in the rack permits the carriage to continue its advance until arrested by engagement of the pinion-tooth 44 with the rack-tooth 40, as seen in Figure 13. This positions the carriage for writing in the code column.

The carriage is automatically returned to the beginning of a new line immediately after the writing of the code symbol, there being provided, for this purpose, motor-controlling means similar to that disclosed in the patent to F. A. Hart, No. 1,238,908, dated September 4, 1917. A link 47 is automatically thrust downward as the carriage 11 is letter-spaced, following the writing in the code column, and, through a rocking lever 48 pivoted on the machine-frame 49, lifts a slide 50 out of engagement with a locking-plate 51. The slide 50 is drawn rearward by a spring 52 when lifted, and through an arm 53 rocks a shaft 54. The rocking of the shaft 54, through suitable connections for the purpose, closes a switch to start the motor 55 and simultaneously connects the motor to a pinion 56 meshing with a carriage-returning rack 57 on the carriage. The motor 55 and its connections are made in separable, removable units, all of which are mounted on the back of the machine-frame 49, in positions such that the height of the machine is not increased by the addition of these parts. The motor 55 is mounted on a bracket 55$^a$, detachably secured by screws 55$^b$, or other suitable means, upon the back of the machine-frame 49. The electrical conductors 55$^c$, which connect the motor with the motor-switch, terminate in a block 55$^d$, which is also removably secured upon the back of the machine-frame. The motor-shaft 58 has fixed upon it a sleeve 59 having slots 60 at its outer end. A second shaft 61, substantially in alignment with the motor-shaft 58, has its end loosely received in the bore of the sleeve 59, and carries pins or lugs 62 which are engaged loosely in the slots 60, forming a universal connection therewith, to drive the shaft 61. It will be seen that the motor with its shaft forms a readily removable and replaceable unit. A worm 63 on the shaft 61 drives a gear 64 on a clutch-member 64$^a$ fixed on a shaft 65. The worm 63 and gear 64 are mounted in a suitable housing 64$^c$, carried on a bracket 64$^b$, removably secured upon the back of the machine-frame 49. The housing may be partially filled with oil to lubricate the worm 63 and gear 64. The housing and its connected parts may be readily removed as a unit, for the purpose of making repairs. The pinion 56 is formed to co-operate with the fixed clutch-member and is connected to the motor 55 by sliding it along the shaft 65 to engage it with the fixed clutch-member 64$^a$.

The shaft 27 of the tabulator-frame 26 is divided, as seen in Figure 3, to permit the clutch-member 64$^a$ to pass through. The sections of the shaft 27 are rigidly connected by a bar 66, which surrounds a rod 67 of the tabulator-frame. A carriage-returning key 68 is provided for use when no entry is to be made in the code column, or in the tax and code columns. This key, when actuated, swings a bell-crank 69 to lift the slide 50 out of engagement with the locking plate 51.

The rack 57, with which the pinion 56 meshes, is supported on guides 70, carried by brackets 71 on the carriage 11. The guides 70 are received in horizontal slots 72 formed in the rack 57, the slots being of sufficient length to permit limited movement of the rack 57 relatively to the carriage 11. Headed screws 73, engaging the rear face of the rack 57 and attached to the guides 70, retain the rack 57 in position on the guides 70. When the movement of the rack 57 by the motor is initiated, the rack moves relatively to the carriage until the guides 70 engage the ends of the slots 72 in the rack, after which the rack and carriage move in unison. During the period when the rack 57 is moving relatively to the carriage 11, the platen 10 is automatically line-spaced. The manual line-spacing mechanism, which is, in general, similar to the usual line-spacing mechanism of the Underwood typewriter, comprises a line-spacing lever 74, a slide 75, a pawl 76 carried by the slide 75, a ratchet-wheel 77 fixed on the platen-shaft 78 for operation by the pawl 76, and a spring 79 for returning the slide 75 to normal position. In accordance with the present invention, the slide 75 is provided with a rearward extension 80, which carries, at its rear end, a pin 81 extending vertically downward. This pin 81 is loosely embraced by a slotted crank 82 on a vertical rock-shaft 83, which is mounted on a lateral extension 84 of the bracket 71 at the left end of the carriage 11. The shaft 83 has a second crank 85 at its lower end, which plays in a recess 86 in the lower face of the rack 57. While the rack 57 is being moved relatively to the carriage 11 by the motor 55, the crank 85 is moved by the rack to rock the shaft 83 clockwise. The crank 82 is thus caused to draw the line-spacing slide 75 to the rear to line-space the platen 10. The loose connection between the crank 82 and vertical pin 81 permits the platen 10 to be shifted for upper-case writing (see Figure 2), without affecting the connection of the line-spacing slide 75 with the carriage-return rack 57.

As the carriage is nearing the completion of its return movement, the right marginal stop is effective through suitable connections, comprising a link 86ª, to open the motor-switch and disconnect the motor 55 from the carriage-returning rack 57, as set forth in the patent to Hart, previously referred to. As soon as the rack 57 is disconnected, the spring 79 draws the line-spacing slide 75 forward to its normal position, and the slide 75, through the described connections with the rack 57, moves the rack 57 toward the right, as seen in Figure 1, relatively to the carriage 11. It will be seen that the operator may line-space the platen 10 at will, through the operation of the line-spacing lever 74.

A chute 87, having right and left lateral edge gages 88 and 89, is mounted on the usual paper-shelf 90 for guiding the bills to the platen 10, with their columns correctly positioned to receive the appropriate entries.

In using the machine, a bill is guided to writing position by means of the chute 87, and the date, number of messages, place called, and company's charge entries are made, the machine being moved, from column to column, by operation of the usual tabulating mechanism. Upon the completion of the entry in the company's charge column, the carriage jumps automatically two extra letter-spaces to the tax column. One of the special tax keys is operated to write the tax item, whereupon the carriage jumps automatically two extra letter-spaces to the code column. A key is operated to write the code symbol, and this automatically causes the return of the carriage and the line-spacing of the platen for the beginning of a new line. Should there be no occasion to make an entry in the tax column in a line, the carriage may be quickly moved to the code column by simply operating the space-bar; and, should there be no entry for either the tax or code column, the carriage may be returned by operation of the carriage-return key 68. At the end of each bill, the total amount of the tax items is written in the company's charge column, and the total amount of the bill is written below this. The platen may be line-spaced without returning the carriage, to position the bill for the writing of these items, by manual operation of the line-spacing lever.

Variations may be resorted to within the scope of the invention, and portions of the improvements may be used without others.

Having thus described my invention, I claim:

1. In a typewriting machine, a carriage, a platen therein shiftable for printing upper-case characters, automatic carriage-returning mechanism comprising a bar movable relatively to the carriage for a limited distance, a vertical rock-shaft operable by the bar during such relative movement of the bar and carriage, a slotted crank on the rock-shaft, and a line-spacing slide having a vertical pin received in the slot of the crank loosely enough to permit relative movement of the pin and crank in case-shifting operations, the arrangement being such that the rocking of the vertical shaft will draw the line-spacing slide rearward to line-space the platen.

2. In a typewriting machine, a carriage, a platen therein shiftable for printing upper-case characters, a line-spacing slide, automatic carriage-return mechanism, and connections between said automatic carriage-return mechanism and the line-spacing slide for causing the platen to be automatically line-spaced by the operation of the carriage-return mechanism, said connections including a vertical pin carried by said line-spacing slide, and a crank having a slot for reception of said pin, the latter being of a length to maintain its operative relation with the slot in all case-positions of the platen.

3. In a typewriting machine having a carriage and a platen, an automatic carriage-returning mechanism including a rack, guides on the carriage supporting said rack, said rack having a slot at each end for receiving the guides, said slots having a greater length than the guides to limit the relative movement of the carriage and rack, and means operatively connected with the rack for automatically line-spacing the platen during such relative movement of the carriage and rack.

4. In a typewriting machine, a carriage, and carriage-returning means including a motor and carriage-operating connections between the motor and the carriage, including a rack carried by said carriage, said motor and the connections forming separable units, each having a shaft, and a pinion-carrying clutch-member in mesh with the rack and freely slidable and rotatable on the shaft associated with said connections so as to be movable into or out of engagement with a complementary clutch-member secured to said last-named shaft, said shafts being separably connected, with provision for universal movement, whereby the pinion and clutch-carrying unit may be readily removed and replaced independently of the motor-unit.

5. In a typewriting machine, a carriage, a carriage-returning mechanism, and a tabulator-stop-frame comprising a pivot-shaft, a rod on which the tabulator-stops are mounted, said shaft being divided to permit the passage between its sections of a carriage-returning member, and a bar connecting the sections of the shaft at one side thereof, said bar surrounding the rod of the tabulator-frame, and being braced thereby.

6. In a typewriting machine, a carriage, carriage-propelling means, and tabulating mechanism comprising a tabulator-stop-frame which includes a shaft, a rod on which the tabulator-stops are mounted, said shaft being divided to permit passage of another part of the machine between its sections, and a connector between the sections of the shaft, at one side thereof, said connector being braced by the rod of the tabulator-frame.

7. In a typewriting machine, a carriage, carriage-propelling means, tabulating mechanism comprising a tabulator-stop-frame, and carriage-returning means comprising a driving member passing from the rear of the machine through the lower portion of the tabulator-stop-frame, said tabulator-stop-frame comprising a rock-shaft made in two sections to permit the passage of the driving member between them, and a member connecting the sections of the shaft at one side thereof beyond said driving member.

8. In a typewriting machine, a carriage, a platen, a carriage-returning motor, a rack connectible with the motor, means on the carriage for supporting and retaining the rack between its ends, with provision for movement relatively to the carriage, line-spacing devices including a returning spring, and means operated by the rack for automatically line-spacing the platen during movement of the rack relatively to the carriage, said spring being effective to return said devices and the rack-operated means to normal position at the termination of said automatic operation.

9. In a typewriting machine, a carriage, a shiftable platen, line-spacing devices, a carriage-returning rack mounted on the carriage and movable relatively thereto, and a rock-shaft operatively connected to said devices and having a movement relative to the rack that is limited by means on the rack and operated by the rack during said relative movement, the action being such that the line-spacing operation is effected before the carriage starts on a return travel.

10. In a typewriting machine, a carriage, a shiftable platen, line-spacing devices including a slide and a returning spring therefor, a carriage-returning rack mounted on the carriage and movable relatively thereto, and a vertical rock-shaft operatively connected to said slide and having a limited movement relative to the rack and operated by the rack during such relative movement of the rack and carriage, the action being such that the line-spacing operation is effected before the carriage starts on a return travel, and the spring being effective at the end of said travel to restore the slide and the rack to their normal positions.

11. In a typewriting machine, a carriage, a shiftable platen, line-spacing devices including a slide and a returning spring therefor, a rear extension on the line-spacing slide, a pin extending vertically downward from the rear extension, a vertical rock-shaft including an arm having a slot for loosely embracing the pin, said rock-shaft also including an operating arm loosely engaging a slot in a rack mounted on the carriage so as to be relatively movable with respect thereto, and means including a pinion for driving the rack whereby to line-space the platen and then return the carriage, the slide-returning spring being effective to also return the rack to normal position at the termination of the carriage-driving operation.

12. In a typewriting machine, a carriage, a platen, carriage-returning mechanism comprising a rack mounted on the carriage for limited movement relatively thereto, said rack having a recess in its lower face, and means for line-spacing the platen as an incident of the carriage-return, comprising a vertical rock-shaft mounted on the carriage and a crank on the rock-shaft received in the recess of the rack for operation by the rack.

13. In a typewriting machine, a carriage, a platen, a carriage-returning motor, a carriage-returning rack on the carriage, movable relatively to the carriage to effect line-spacing of the platen, and means connecting the rack and the motor, comprising a horizontal shaft, a clutch-member fixed on the shaft, and a pinion in mesh with the rack and slidable along said shaft into and out of engagement with the fixed clutch-member.

14. In a type-writing machine, a carriage, a platen, a carriage-returning motor, a carriage-returning rack on the carriage, a horizontally-movable clutch-member always operatively connected with said rack for connecting the rack with the carriage-returning motor, line-spacing mechanism, including means for restoring the same to normal position, said rack being movable relatively to the carriage to operate the line-spacing mechanism, and means for automatically disengaging the rack and motor at the conclusion of the carriage-return movement, said means for restoring the line-spacing mechanism being also effective to automatically restore the rack to its initial position with relation to the carriage.

15. In a typewriting machine, a carriage, a carriage-returning pinion, a motor for driving the pinion, pinion-driving connections between the motor and the pinion, comprising a shaft extending along the back of the machine, a second shaft extending forwardly from adjacent the end of the first shaft remote from the motor, a clutch engageable with the carriage-returning pinion, fixed on said second shaft, gearing operatively connecting said shafts, and a housing for said gearing.

16. In a typewriting machine, a carriage, a carriage-returning motor mounted on the back of the machine at one side thereof, a unitary carriage-returning transmission-device between the motor and the carriage, including a horizontal shaft extending along the rear of the machine, a gear driven by said shaft, a second gear driven by said first gear, a second shaft on which the second gear is mounted, said second shaft having a clutch-member fixed thereto, a pinion slidable and revoluble on said second shaft, and also including a clutch-member movable into or out of engagement with the fixed clutch-member, and a rack on the carriage in engagement with the pinion.

17. In a typewriting machine having a carriage, a platen and a line-spacing mechanism, and automatic carriage-returning mechanism including a rack, spaced-off guides on the carriage for the rack, slots in each end of the rack to receive said guides, said slots and guides co-operating to allow for a free limited movement of the rack independently of the carriage and in a carriage-return direction, means positively connecting the rack with the line-spacing mechanism to line-space the platen during said independent movement of the rack, and a single spring operative to restore the line-spacing mechanism and through said positive connections simultaneously restore said rack at the end of a carriage-return movement.

HENRY L. PITMAN.